US005518533A

United States Patent [19]
Howe

[11] Patent Number: 5,518,533
[45] Date of Patent: May 21, 1996

[54] AUTOMOTIVE PROTECTANT FOR USE WITH CLEANING COMPOSITIONS

[75] Inventor: Michael W. Howe, Mission Viejo, Calif.

[73] Assignee: Armor All Products Corporation, Aliso Viejo, Calif.

[21] Appl. No.: 278,454

[22] Filed: Jul. 21, 1994

[51] Int. Cl.$^6$ ................ C09G 1/04; C09G 1/18
[52] U.S. Cl. ............ 106/3; 106/287.11; 106/287.13; 106/287.16; 127/4; 252/140
[58] Field of Search ............... 252/140; 106/3, 106/287.11, 287.13, 287.16; 127/4

[56] References Cited

U.S. PATENT DOCUMENTS

| | | | |
|---|---|---|---|
| 3,585,051 | 6/1971 | Johnson | 106/3 |
| 4,592,934 | 6/1986 | Wolstencroft | 106/3 |
| 4,600,436 | 7/1986 | Traver et al. | 106/3 |
| 5,043,012 | 8/1991 | Shinohara et al. | 106/10 |
| 5,330,787 | 7/1994 | Berlin et al. | 106/3 |

FOREIGN PATENT DOCUMENTS

| | | | |
|---|---|---|---|
| 53-003992 | 2/1978 | Japan | 106/3 |
| 1-163280 | 6/1989 | Japan | 106/3 |

*Primary Examiner*—David Brunsman
*Attorney, Agent, or Firm*—Flehr, Hohbach, Test, Albritton & Herbert

[57] ABSTRACT

A protective composition for automotive painted surfaces is provided, which is used with a detergent. The protective composition comprises modified silicone, a cationic emulsifier, and a dispersant.

19 Claims, No Drawings

6,518,533

AUTOMOTIVE PROTECTANT FOR USE WITH CLEANING COMPOSITIONS

FIELD OF THE INVENTION

This invention relates to an automotive protectant suitable for use on painted automotive surfaces, which is used with a cleaning composition.

BACKGROUND OF THE INVENTION

Many different types of automotive protectants are known in the art. For example, many different paste and liquid waxes are known. These products are applied to a surface, generally after washing, and are rubbed or buffed to give a protective finish to the car. Such products generally require a minimum of 45 to 90 minutes for one person to apply, depending on the size of the car, and the application of a physical "buffing" force.

To overcome these disadvantages, several silicone-based treatments are on the market, such as "ZOIEG", "WATERLESS CAR WASH" AND "NU FINISH". These products are organic solvent-based solutions of various silicones. These products rely upon high levels of solvents and abrasives to provide uniform, level films of silicone. These products generally do not show enhancement of color or gloss, and do not provide significant durability. Conventional waxes and polishes are also applied after washing or cleaning the surface.

It is an object of the invention to provide a protectant which enhances color, gloss and durability of an automotive painted surface, and is applied at the same time the surface is washed.

SUMMARY OF THE INVENTION

In one aspect, the invention provides a protective composition comprising a cationic emulsifier, modified silicone, and a dispersant, for use with a washing detergent on painted surfaces.

In an additional aspect, the invention provides a protective composition comprising a cationic silicone and a dispersant.

A further aspect provides a method of protecting a painted surface comprising washing the surface with a mixture of a detergent and the protective composition of the present invention.

Also provided are cleaning and protective compositions comprising a mixture of a detergent and the protective compositions of the present invention.

DETAILED DESCRIPTION OF THE INVENTION

Typically, the desirable properties of a automotive protective composition are the enhancement of color, gloss and durability, as well as ease of application.

The protective compositions of the present invention are generally in concentrated form, and thus do not contain a significant amount of water. However, they are designed to be dispersed in aqueous solutions such as water.

One embodiment of the present invention provides such a protective composition comprising modified silicone, a cationic emulsifier, and a dispersant, which is applied as the surface is cleaned with a detergent and water.

By "dispersant" herein is meant a compound which facilitates the uniform dispersal of the protective composition in the wash water containing the detergent, prior to application to the surface. In addition, the dispersant contributes to wetting the surface and promoting spreadability, thus providing a uniform film of silicone and avoiding streaks and irregularities in the protectant.

Suitably, the dispersant is a glycol or an alcohol. For example, the dispersant may be, but is not limited to, propylene glycol, ethylene glycol, polyethylene glycol, hexalyene glycol, polypropylene glycol, or glycol ethers such as propylene glycol n-propyl ether, or mixtures thereof. Propylene glycol is preferred. Alternatively, the dispersant may be a low molecular weight alcohol such as methanol, butanol, pentanol, ethanol, isopropyl alcohol, hexanol, with isopropyl alcohol being preferred.

The dispersant ranges from about 0% to about 45% by weight in the concentrated protective composition, with about 10% to about 35% being preferred, and about 25% being the most preferred.

By "cationic emulsifier" herein is meant an emulsifier which carries a positive charge. The cationic emulsifier provides two important functions. One is to emulsify the modified silicone in the composition and in the wash water, thus allowing a uniform film of silicone to be deposited on the surface. Additionally, as is known in the art, many surfaces, such as the painted surfaces of automobiles, are negatively charged. The cationic emulsifier forms electrostatic bonds with the surface, thus drawing the emulsified silicone to the surface and forming a durable film.

Preferably, the cationic emulsifier contains an imidolazine component. Imidolazine, as is known in the art, is a positively charged, surface seeking compound that will displace water from a surface. Thus, when imidolazine is a component of the cationic emulsifier, it allows good deposition of the protective composition on the painted surface.

However, imidolazine does not have good affinity for aqueous solutions such as water. Accordingly, in a preferred embodiment, the imidazoline-containing cationic emulsifier is further derivatized, via acid neutralization, to enhance the water affinity. For example, the imidazoline-containing cationic emulsifier may be neutralized with phosphoric acid, to form imidolazine phosphate. Other suitable acids include, but are not limited to, acetic acid, hydrochloric acid, sulfuric acid, hydroxyacetic acid, fatty acids such as oleic.

In a preferred embodiment, the cationic emulsifier is selected from the group including, but not limited to, quaternary ammonium compounds, and oleyl imidazoline phosphate.

The cationic emulsifier suitably ranges from about 9% to about 65% by weight in the concentrated protective composition, with about 30% to about 50% being preferred, and about 33% being the most preferred.

By "modified silicone" herein is meant a silicone which has been modified to render it capable of deposition on the surface in the presence of detergent and providing a glossy, color enhanced, water-beading, durable surface. The silicone may be derivatized or underivatized. The modified silicone may be one type of silicone, or several. Preferred embodiments utilize silicones including, but not limited to, dimethyl-containing silicones, amino-functional silicones, and cationic silicones.

Generally, at least one silicone component of the modified silicone will have a high molecular weight. Generally, the higher the molecular weight of the silicone, the more waxlike properties are imparted, such as higher gloss, color enhancement, water-beading and durability. However, when the molecular weight is too high, the silicone becomes similar to conventional waxes with their attendant problems, such as difficulty of application. A preferred range of molecular weights for the modified silicones is from about 500 to about 30,000.

Particularly preferred are mixtures of amino-functional silicones. For example, an amino-functional silicone with a high base equivalent is combined with an amino-functional silicone with a lower base equivalent. An amino-functional silicone of "high base equivalent", as is known in the art, means the silicone polymer is derivatized with sufficient amine groups to provide the following characteristics: (1) the modified silicone has a greater affinity for aqueous solutions, and thus is easier to disperse in water, and (2) the amine groups provide the active sites to facilitate bonding with the surface. Generally, a high base equivalent is greater than or equal to 1.5 milliequivalent of base per gram of fluid; preferred are high base equivalent amino-functional silicones with molecular weights about 1350. Suitable high base equivalent amino-functional silicones include "F756", manufactured by Wocker Silicones Corp. or Dow Corning 531, 929 or 939.

However, for some formulations, a high base equivalent amino-functional silicone by itself may be washed off the surface too easily, due to this increased mobility in water. A lower base equivalent amino-functional silicone, with a higher molecular weight, may be mixed with the high base equivalent silicone to provide the desirable durability and gloss characteristics of silicone, in form which will disperse in water and provide a uniform film of silicone on a surface. Generally, the mixture can be from about 2:1 to about 1:2, high:low, with about 1:1 preferred. Suitable lower base equivalent amino-functional silicones have less than or equal to 0.45 milliequivalent of base per gram of fluid, and include "F784", manufactured by Wocker Silicones Corp. and Dow Corning 536.

The lower base equivalent amino-functional silicones have similar properties to a dimethyl silicone.

Accordingly, alternative embodiments utilize a mixture of a high base equivalent amino-functional silicone such as "F756" and a dimethyl silicone. In this embodiment, suitable dimethyl silicones include those with viscosities from 500–30,000 cps.

In an alternative embodiment, the modified silicone may be a single type of amino-functional silicone. Suitable amino-functional silicones in this embodiment include, but are not limited to, Wocker Silicones Corp. F784, and Dow Corning 536.

In an alternative embodiment, the modified silicone comprises a cationic silicone. By "cationic silicone" herein is meant a silicone polymer which has a positive charge. Examples include silcones derivatized with: imidolazine, quaternary ammonium compounds, and imidozaline which has the ring opened to form an amidoamine; which are subsequently acid neutralized to give a positively charged silicone polymer.

In a preferred embodiment, the cationic silicone comprises imidazoline-derivatized silicone which is acid neutralized. As outlined above, the imidolazine is a surface seeking compound. When derivatized to silicone, the imidolazine facilitates the deposition of silicone on the surface. However, as outlined above, imidolazine and imidolazine-derivatized silicone is hydrophobic, and thus may be poorly dispersed in aqueous solution. Accordingly, as outlined above, the imidolazine may be also further derivatized, via acid neutralization, (e.g. using phosphoric acid) to enhance the water affinity.

The cationic silicone may be derivatized with imidolazine in a variety of ways. In a preferred embodiment, a single imidolazine molecule is added at least to each end of the silicone polymer. In additional embodiments, the silicone polymer may be derivatized with more than two imidolazine molecules, similar to the amino-functional silicones. Higher derivatizations can result in tighter bonding of the cationic silicone to the surface, and thus a more durable protective finish. In addition, the silicone backbone chosen for derivitization may be a variety of molecular weights, as described above.

Generally, the imidolazine-derivatized silicones are made using commercially available amino-functional silicones as starting materials. The amino-functional moiety is then cyclized to form imidalozine. An alkyl group is then added, for example an oleyl group.

The modified silicone ranges from about 33% to about 85% by weight in the concentrated protective composition, with about 35% to about 65% being preferred, and about 44% being the most preferred.

In one embodiment, the protective composition of the present invention comprises a cationic silicone and a dispersant. In this embodiment, the cationic silicone provides the function of both the modified silicone and the cationic emulsifier. In this embodiment, the cationic silicone ranges from about 23% to about 100% by weight, with about 30% to about 80% being preferred, and about 33% being the most preferred. In this embodiment, the dispersant comprises from about 20% to about 95% by weight, with about 33% to about 80% being preferred, and about 67% being the most preferred.

In a preferred embodiment, the protective composition further comprises one or more detergent compounds. In this instance, the resulting cleaning and protective composition contains concentrated or minimally diluted detergent mixed with the concentrated protective compositions described above.

The protective composition of the present invention is essentially free of abrasives, such as silicas, silicates, kaopolite or celite, normally found in silicone-based protectant products, nor volatile organic compounds or solvents.

Once formulated, the protective composition is used as follows. The protective composition is added to wash water, comprising a detergent and water. Generally, the protective composition is added from about 10 gms to about 35 gms per gallon of wash water, with about 12 to about 23 being preferred, and about 15 gms being the most preferred. This translates roughly to about 0.5 ounce per gallon of wash water. This is the diluted protective composition, dispersed in water.

In the preferred embodiment, the detergent and protective composition are added to a wash container first, and then the water is added. Alternative embodiments add the detergent, water and protective composition in any order. Thus, the detergent and protective composition are dispersed in the water.

Suitable detergent types and concentrations in the wash water are quite broad. Standard detergents, such as Armor All Car Wash, which are frequently used in car-washing compositions, are acceptable. Dish-washing detergents are also acceptable. In a preferred embodiment, the detergent is not exclusively anionic; although most detergents have some anionic detergent present, a mixture of anionic and nonionic, or cationic, detergents are preferred. A wide range of detergent concentrations is similarly suitable, preferably ranging from about 0.5 oz to about 3 oz. in water.

Once the detergent and protective composition are dispersed in water, the surface is simultaneously cleaned and protected using a cloth or sponge to apply the mixture of detergent and protective composition. In a preferred embodiment, the surface is a high-gloss painted metal surface wet with water prior to application. The protective composition will deposit on the surface during washing, forming a uniform film of protection.

After applying, the detergent is rinsed off, preferably by using a stream of clean water. The surface may be then dried, using a clean, dry cloth.

The composition may be applied to any automotive painted surface. "Automotive" in this context is interpreted broadly, and may include an automotive body or hubcap, or other vehicles such as motorcycles, or other surfaces with a shiny painted surface. The surface may be clean, dirty, new or moderately oxidized. The surface may be cool or hot.

When applied in this manner, the protective composition protects and beautifies the painted surfaces of a car without smearing or streaking. It provides a high gloss on the surface, and enhances the color of the surface. It provides a durable, water beading surface. Durability is measured by the water-beading capabilities of the surface over time. A loss of shine may also indicate a loss of protectant.

The following examples serve to more fully describe the manner of using the above-described invention, as well as to set forth the best modes contemplated for carrying out various aspects of the invention. It is understood that these examples in no way serve to limit the true scope of this invention, but rather are presented for illustrative purposes.

EXAMPLES

Example 1

Preparation of a Protective Composition

A typical formulation of a protective composition containing a cationic emulsifier, a dispersant and modified silicone is as follows:

| Ingredient | Order of addition | Amount (% wt) |
| --- | --- | --- |
| oleyl imidolazine phosphate | 1 | 33.3 |
| propylene glycol amino-functional silicone: | 4 | 22.2 |
| F756 | 2 | 22.2 |
| F784 | 3 | 22.2 |

An alternative formulation is as follows:

| Ingredient | Order of addition | Amount (% wt) |
| --- | --- | --- |
| oleyl imidolazine phosphate | 1 | 33.3 |
| propylene glycol amino-functional silicone: | 4 | 22.2 |
| F531 | 2 | 6.3 |
| F536 | 3 | 38.1 |

The oleyl imidozaline phosphate was made as shown in Example 2. The amino-functional silicones, "F756", "F784", "531" and "536" were obtained from Wocker, Inc.

The composition was made as above, mixed with low or moderate shear in the order listed.

18 gms of the composition was added to 1 gallon of water containing 1 oz. of DAWN dishwashing liquid. A variety of automotive painted surfaces under various conditions, including clean, dirty and moderately oxidized surfaces were treated. In addition, the composition was applied both in full sunlight as well as in shade. The surfaces were prewet using clean water. The composition of the detergent and protectant were applied with a clean cloth, and the surface rubbed to remove dirt. The surface was then rinsed using clean water, and dried with a clean, dry cloth.

The treatment resulted in high gloss and color enhancement, with actual durability exceeding 4 weeks.

Example 2

Preparation of a Cationic emulsifier

Oleyl imidolazine phosphate may be purchased or made as follows. An amount of imidolazine was weighed and placed in a container. With mixing, phosphoric acid was added slowly, until a uniform mixture was obtained after neutralization. The phosphoric acid was anhydrous or contained up to 25% water. The final pH ranged from 6.8 to 7.8, with 7.0 being preferred. The cationic emulsifier is then cooled and added to the protective compositions.

Example 3

Preparation of a Protective composition

A typical formulation of a protective composition containing a cationic emulsifier, a dispersant and modified silicone is as follows:

| Ingredient | Amount (% wt) |
| --- | --- |
| cationic silicone | 66.67 |
| propylene glycol | 3.33 |

The cationic silicone was obtained from Mona, Industries, and was made as described as in the specification. The composition was made by mixing in the order listed.

30 gms of the composition was added to 1 gallon water containing 1 oz. of DAWN dishwashing liquid. A variety of automotive painted surfaces under various conditions, including clean, dirty and moderately oxidized surfaces were treated. In addition, the composition was applied both in full sunlight as well as in shade. The surfaces were prewet using clean water. The composition of the detergent and protectant were applied with a clean cloth, and the surface rubbed to remove dirt. The surface was then rinsed using clean water, and dried with a clean, dry cloth.

The treatment resulted in high gloss and color enhancement, with actual durability exceeding 4 weeks.

I claim:

1. A protective composition for use with a washing detergent comprising a cationic emulsifier, modified silicone, and a dispersant, wherein said composition does not contain wax.

2. The protective composition of claim 1 wherein said cationic emulsifier is a quaternary ammonium compound.

3. The protective composition of claim 2 wherein said quaternary ammonium compound is oleyl imidazoline phosphate.

4. The protective composition of claim 1 wherein said modified silicone is selected from the group consisting of amino-functional silicone and dimethyl silicone.

5. The protective composition of claim 1 wherein said modified silicone is amino-functional silicone.

6. The protective composition of claim 1 wherein said dispersant is an alcohol.

7. The protective composition of claim 6 wherein said alcohol is a glycol.

8. The protective composition of claim 1 wherein said dispersant is propylene glycol.

9. A method of protecting an automotive surface comprising washing said surface with a mixture of a detergent and the composition of claim 1.

10. The method of claim 9 wherein said method further comprises drying the surface.

11. A cleaning and protective composition comprising a mixture of a detergent and the protectant of claim 1.

12. The cleaning and protective composition of claim 11 dispersed in water.

13. A protective composition comprising: a cationic emulsifier ranging from about 15% to about 65% by weight; modified silicone ranging from about 33% to about 50% by weight; and a dispersant ranging from about 15% to about 45% by weight.

14. A protective composition for use with a washing detergent comprising a cationic silicone and a dispersant.

15. The protective composition of claim 14 wherein said dispersant is a glycol.

16. The protective composition of claim 14 wherein said cationic silicone is imidalozine-derivatized silicone which has been acid neutralized.

17. A method of protecting an automotive surface comprising washing said surface with a mixture of a detergent and the composition of claim 14.

18. A cleaning and protective composition comprising a mixture of a detergent and the protectant of claim 14.

19. The cleaning and protective composition of claim 18 dispersed in water.

* * * * *